(12) United States Patent
Sakai

(10) Patent No.: US 9,581,164 B2
(45) Date of Patent: Feb. 28, 2017

(54) MANUFACTURING METHOD FOR FUEL PUMP

(71) Applicant: DENSO CORPORATION, Kariya, Aichi-pref. (JP)

(72) Inventor: Hiromi Sakai, Nukata-gun (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 143 days.

(21) Appl. No.: 14/456,120

(22) Filed: Aug. 11, 2014

(65) Prior Publication Data

US 2015/0107105 A1  Apr. 23, 2015

(30) Foreign Application Priority Data

Oct. 23, 2013 (JP) .................................. 2013-220274

(51) Int. Cl.
*H02K 15/14* (2006.01)
*F04D 13/06* (2006.01)
*F04D 5/00* (2006.01)
*H02K 15/02* (2006.01)

(52) U.S. Cl.
CPC ............ *F04D 13/06* (2013.01); *F04D 5/002* (2013.01); *H02K 15/022* (2013.01); *H02K 15/028* (2013.01); *H02K 15/14* (2013.01); *Y10T 29/49236* (2015.01)

(58) Field of Classification Search
CPC ....... F04D 13/06; F04D 5/002; H02K 15/022; H02K 15/14; H02K 15/028; Y10T 29/49236
See application file for complete search history.

(56) References Cited

U.S. PATENT DOCUMENTS

| 7,363,696 | B2* | 4/2008 | Kimura .................. F01C 21/10 29/596 |
| 2005/0115055 | A1 | 6/2005 | Kimura et al. |
| 2010/0034674 | A1* | 2/2010 | Oota ...................... F02M 37/08 417/410.1 |
| 2012/0027629 | A1 | 2/2012 | Tanahashi et al. |
| 2014/0099221 | A1 | 4/2014 | Tanahashi et al. |

FOREIGN PATENT DOCUMENTS

| JP | H03-18252 A | 1/1991 |
| JP | H05-43746 U | 6/1993 |
| JP | 2012-228178 A | 11/2012 |
| JP | 2013-68187 A | 4/2013 |
| JP | 2013-150536 A | 8/2013 |

OTHER PUBLICATIONS

Office Action issued Sep. 8, 2015 in corresponding JP Application No. 2013-220274.

* cited by examiner

*Primary Examiner* — Sarang Afzali
*Assistant Examiner* — Ruth G Hidalgo-Hernandez

(57) ABSTRACT

A stator has ribs, which are configured to make contact with an inner wall of a housing when accommodated in the housing. In a deformation process, force is applied from a radially outside to first portions of the housing to elastically deform the housing. In an insertion process subsequent to the deformation process, the stator is inserted into the housing, such that the ribs are enabled to make contact with second portions of the housing, which are elastically deformed radially outward. In an affixation process subsequent to the insertion process, application of the force is released to cause the ribs to make contact with an inner wall of the housing.

10 Claims, 4 Drawing Sheets

MANUFACTURING METHOD FOR FUEL PUMP

CROSS REFERENCE TO RELATED APPLICATION

This application is based on reference Japanese Patent Application No. 2013-220274 filed on Oct. 23, 2013, the disclosure of which is incorporated herein by reference.

TECHNICAL FIELD

The present disclosure relates to a manufacturing method for a fuel pump.

BACKGROUND

A known fuel pump includes an impeller, which is rotational inside a pump chamber, and a motor portion, which drives the impeller. The fuel pump press-feeds fuel in a fuel tank into an internal combustion engine by utilizing rotation of the impeller. Patent Document 1 discloses a fuel pump equipped with a motor portion, which includes a stator and a rotor. The stator is equipped with a winding. The rotor is equipped on the radially inside of the stator and connected to the impeller via a shaft.

(Patent Document 1)
Publication of unexamined Japanese patent application No. 2012-228178

The fuel pump disclosed in Patent Document 1 has multiple ribs on the radially outside of the stator in order to align the center axis of the stator relative to the center axis of the housing, which accommodate the stator. The ribs are formed in consideration of a press-fitting margin of the stator relative to the housing. In a manufacturing process of the fuel pump disclosed in Patent Document 1, the stator is press-fitted into the tubular housing, such that the multiple ribs make contact to the inner wall of the housing in uniform. In the present state, the multiple ribs are slid on the inner wall of the housing. Therefore, the ribs may deform due to burr and/or a plucking. Consequently, the position of the stator may be shifted relative to the position of the housing. Thus, alignment between the center axis housing and the center axis of the stator may be made at low accuracy.

SUMMARY

It is an object of the present disclosure to produce a manufacturing method for a fuel pump enabling to align a center axis of a housing relative to a center axis of a stator accurately.

According to an aspect of the present disclosure, a fuel pump comprises a housing in a tubular shape. The fuel pump further comprises a pump cover equipped to one end of the housing, the pump cover having an inlet port for drawing fuel. The fuel pump further comprises a cover end equipped to an other end of the housing, the cover end having an outlet port for discharging fuel. The fuel pump further comprises a stator in a tubular shape, the stator equipped with a plurality of windings, the stator having a plurality of ribs, which are configured to make contact with an inner wall of the housing when accommodated in the housing. The fuel pump further comprises a rotor rotatable on a radially inside of the stator. The fuel pump further comprises a shaft coaxial with the rotor and rotatable integrally with the rotor. The fuel pump further comprises an impeller equipped to an end of the shaft on a side of the pump cover, the impeller rotatable with the shaft to pressurize fuel flowing from the inlet port and to discharge fuel through the outlet port. A manufacturing method for the fuel pump comprises applying force from a radially outside to a plurality of first portions of a sidewall of the housing to elastically deform the housing in a deformation process. The manufacturing method further comprises inserting the stator into the housing, such that the ribs are enabled to make contact with second portions of the sidewall of the housing, the second portions being elastically deformed radially outward, in an insertion process subsequent to the deformation process. The manufacturing method further comprises releasing application of the force to cause the ribs to make contact with the inner wall of the housing, in an affixation process subsequent to the insertion process.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, embodiments of the present disclosure will be described with reference to drawings.

Embodiment

A fuel pump according to one embodiment of the present disclosure will be described with reference to FIGS. 1 to 4B.

Figure 1:
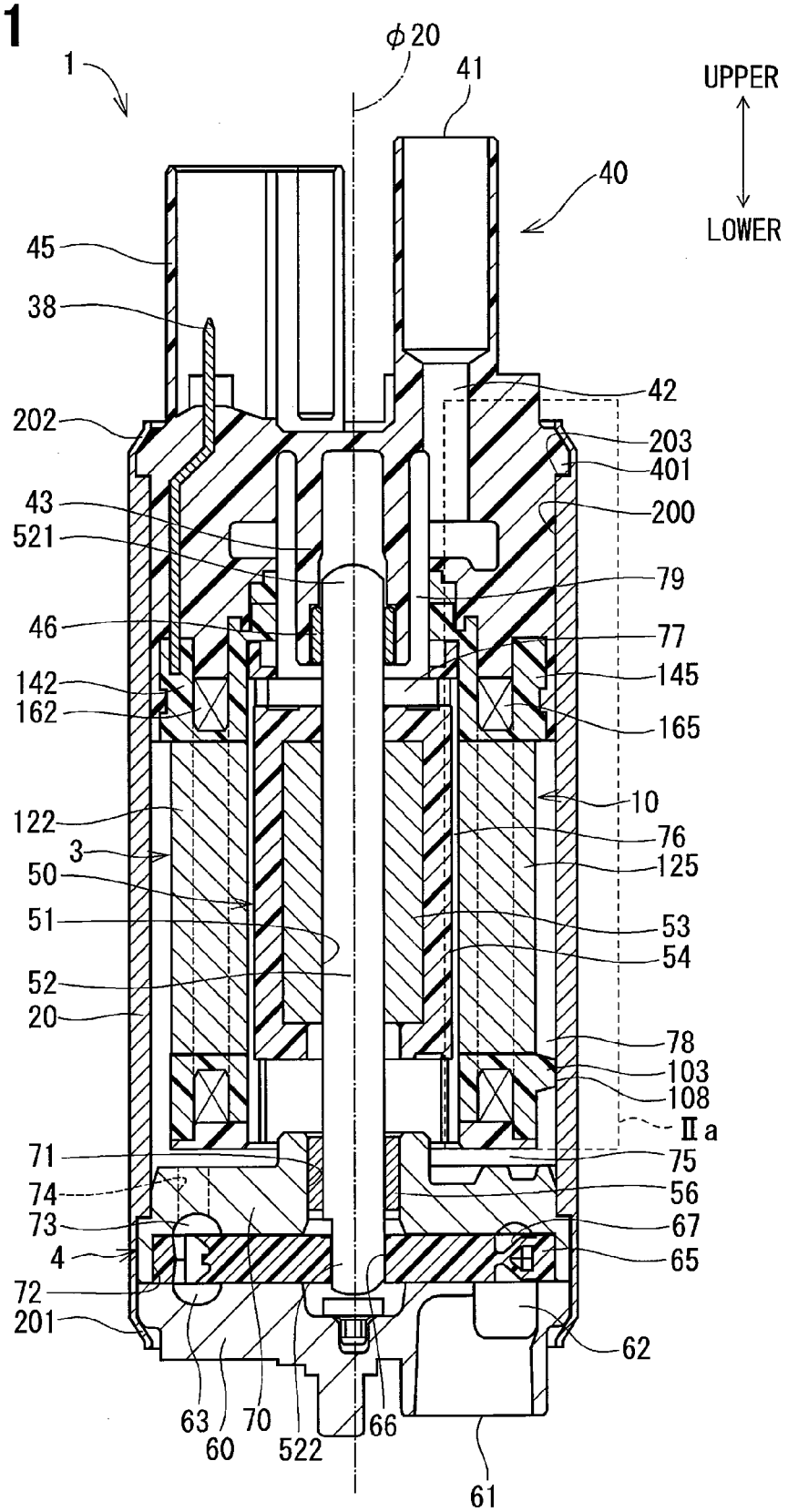
FIG. 1 is a sectional view showing a fuel pump manufactured by a manufacturing method according to one embodiment of the present disclosure.

A fuel pump 1 includes a housing 20, a pump cover 60, a cover end 40, a motor portion 3, a pump portion 4, and/or the like. In the fuel pump 1, the housing 20, the pump cover 60, and the cover end 40 form a space, which accommodates the motor portion 3 and the pump portion 4. The fuel pump 1 draws fuel from a fuel tank (not shown) through an inlet port 61 on the lower side in FIG. 1. The fuel pump 1 discharges fuel through an outlet port 41 on the upper side in FIG. 1 to an internal combustion engine. In FIG. 1, the upper side corresponds to an upper side relative to the direction of gravitational force, and the lower side corresponds to a lower side relative to the direction of gravitational force.

The housing 20 is formed of a metallic material, such as a ferrous material, and is in a tubular shape. The pump cover 60 closes an end 201 of the housing 20 on the side of the inlet port 61. A periphery of the end 201 is crimped inward, thereby to avoid detachment of the pump cover 60 along a direction of a center axis φ20 of the housing 20. The pump cover 60 has the inlet port 61, which is for drawing fuel from the fuel tank into the housing 20. The inlet port 61 internally defines an inlet passage 62, which extends through the pump cover 60 along the direction of the center axis ϕ20.

The cover end 40 is formed of resin. The cover end 40 closes an end 202 of the housing 20 on the side of the outlet port 41. The cover end 40 has a periphery defining a step portion 401. The housing 20 has an inner wall 200 defining a step 203. The step portion 401 of the cover end 40 is fitted to the step 203 of the housing 20. In addition, a periphery of the end 202 of the housing 20 is crimped inward, thereby to avoid detachment of the cover end 40 along the direction of the center axis ϕ20 of the housing 20. The cover end 40 has the outlet port 41, which is for discharging fuel from the inside of the housing 20 to the outside of the housing 20. The outlet port 41 internally defines an outlet passage 42, which extends through the cover end 40 along the direction of the center axis ϕ20. The cover end 40 forms a bearing accommodating portion 43, which is in a bottomed tubular shape and is located at a center of the housing 20. The bearing accommodating portion 43 is located inside the housing 20. The bearing accommodating portion 43 internally forms a space, which accommodates an end 521 of a shaft 52 and a bearing 46. The bearing 46 rotatably supports the end 521 of the shaft 52.

The motor portion 3 includes a stator 10, a rotor 50, the shaft 52, and/or the like. The motor portion 3 is a brushless motor. When electric power is supplied to the stator 10, the motor portion 3 generates a rotating magnetic field to rotate the rotor 50 together with the shaft 52.

Figure 2A:
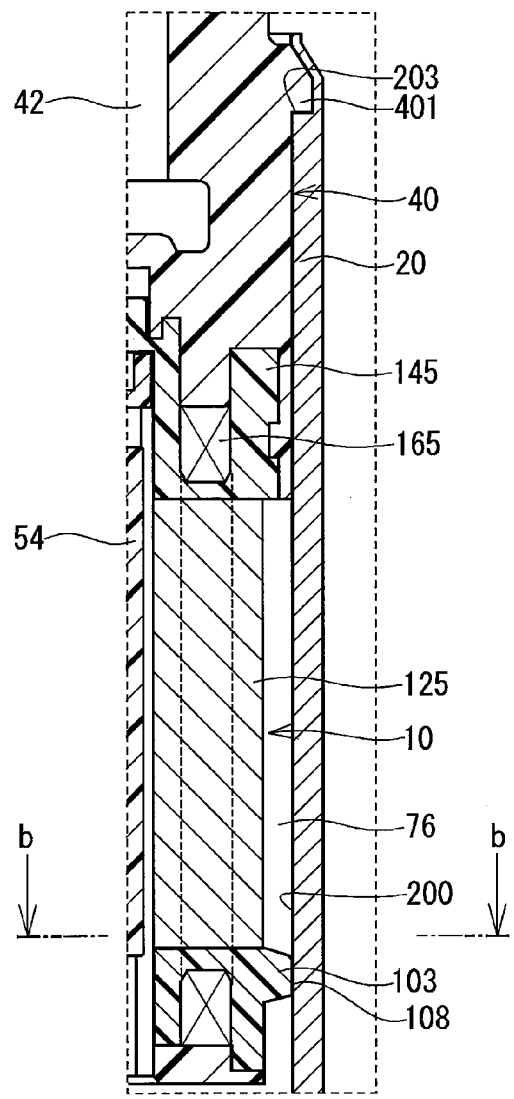
FIG. 2A is an enlarged view showing a portion of the fuel pump surrounded by a dotted square boundary IIa in FIG. 1.
Figure 2B:
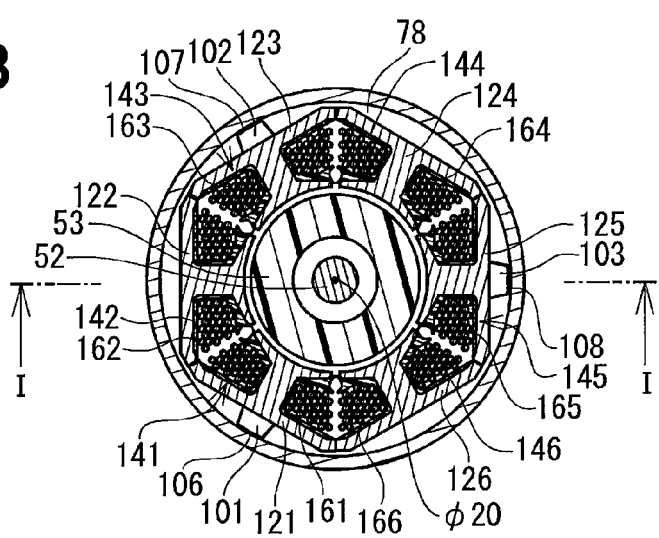
FIG. 2B is a sectional view showing the fuel pump.

The stator 10 is in a tubular shape and is accommodated in the housing 20. As shown in FIG. 2B, the stator 10 includes six cores 121, 122, 123, 124, 125, 126, six bobbins 141, 142, 143, 144, 145, 146, six windings 161, 162, 163, 164, 165, 166, three connection terminals, and/or the like. The stator 10 is integrally formed by molding these components of resin.

Each of the cores 121, 122, 123, 124, 125, 126 is formed by stacking multiple magnetic members, such as magnetic plates formed of, for example, a ferrous material. The cores 121, 122, 123, 124, 125, 126 are arranged along the circumferential direction and are opposed to a magnet 54 of the rotor 50.

The bobbins 141, 142, 143, 144, 145, 146 are insert-molded of a resin material integrally with the cores 121, 122, 123, 124, 125, 126, which are inserted in the insert-molding.

The windings 161, 162, 163, 164, 165, 166 are, for example, copper wires each sheathed with an insulative material. The windings 161, 162, 163, 164, 165, 166 are wound around the bobbins 141, 142, 143, 144, 145, 146, in which the cores 121, 122, 123, 124, 125, 126 are inserted, respectively, to form a coil. The winding 161, 162, 163, 164, 165, 166 are electrically connected with the three connection terminals. The three connection terminals are equipped on the upper side of the fuel pump 1.

The three connection terminals are fixed to the cover end 40. Specifically, as shown in FIG. 1, a connection terminal 38 is one of the three connection terminals. The connection terminal 38 extends through the cover end 40 along the direction of the center axis ϕ20. The connection terminal 38 has an external end. The external end of the connection terminal 38 is accommodated in an electric connector portion 45, which is equipped to the cover end 40. The external end is projected along the direction of the center axis ϕ20. Remaining two of the connection terminals (not shown) other than the connection terminal 38 are also accommodated in the electric connector portion 45, similarly to the connection terminal 38. The three connection terminals receive three-phase electric power from an electric power unit (not shown).

The stator 10 has a radially outside equipped with multiple ribs. As shown in FIG. 2B, in the fuel pump 1 according to the one embodiment, ribs 101, 102, 103 are formed at regular intervals. The ribs 101, 102, 103 are arranged on a concentric circle, which is centered on a point on the center axis of the stator 10. Specifically, the rib 101 is formed on the radially outside of the bobbin 141. The rib 102 is formed on the radially outside of the bobbin 143. The rib 103 is formed on the radially outside of the bobbin 145. The ribs 101, 102, 103 have wall surfaces 106, 107, 108, respectively, on the radially outside. The wall surfaces 106, 107, 108 are at the same distance from the point on the center axis of the stator 10. When the stator 10 is fitted into the housing 20, the wall surfaces 106, 107, 108 make contact with the inner wall 200 of the housing 20. In the present state, the center axis of the stator 10 coincides with the center axis ϕ20 of the housing 20.

The rotor 50 is rotatably accommodated inside the stator 10. In the rotor 50, the magnet 54 is equipped to surround the iron core 53. The magnet 54 has N poles and S poles, which are arranged alternately at the circumferential direction. According to the one embodiment, the N poles and the S poles include two pairs to include four poles in total.

The shaft 52 is press-fitted in a shaft hole 51 and is rotatable together with the rotor 50. The shaft hole 51 is formed on the center axis of the rotor 50.

The pump portion 4 includes a pump casing 70, an impeller 65, and/or the like. The pump casing 70 is substantially in a circular plate shape and is located between the pump cover 60 and the stator 10. The pump casing 70 forms a pump chamber 72 with the pump cover 60. The pump chamber 72 accommodates the impeller 65. The pump casing 70 has a center portion, which has a hole 71. The hole 71 extends through the pump casing 70 along the direction of the center axis ϕ20. A bearing 56 is fitted to the hole 71. The bearing 56 rotatably supports an end 522 of the shaft 52 on the side of the pump chamber 72. The present configuration enables the rotor 50 and the shaft 52 to rotate relative to the cover end 40 and the pump casing 70.

The impeller 65 is formed of resin and is substantially in a circular plate shape. The impeller 65 is rotatably accommodated in the pump chamber 72. The end of the shaft 52 is partially shaved radially to have a cross section in a D-shape. The end 522 of the shaft 52 is fitted in a hole 66, which is formed in the center portion of the impeller 65. The hole 66 is in a D-shape correspondingly. The present configuration enables the impeller 65 to rotate in the pump chamber 72 with rotation of the shaft 52.

The pump cover 60 has a surface on the side of the impeller 65, and the surface of the pump cover 60 defines a groove 63. The groove 63 is connected to the inlet passage 62. The pump casing 70 has a surface on the side of the impeller 65, and the surface of the pump casing 70 defines a groove 73. The groove 73 is in communication with a fuel passage 74. The fuel passage 74 extends through the pump casing 70 in an axis direction of the shaft 52. The impeller 65 has a slope 67 at a position corresponding to the groove 63 and the groove 73.

In the fuel pump 1, when electric power is supplied to the winding 161, 162, 163, 164, 165, 166 through the connection terminals, the impeller 65 rotates together with the rotor 50 and the shaft 52. When the impeller 65 rotates, fuel in the fuel tank, in which the fuel pump 1 is accommodated, is drawn through the inlet port 61 and the inlet passage 62 into the groove 63. The impeller 65 rotates to pressurize fuel, which is drawn into the groove 63, and to draw the pressurized fuel into the groove 73. The pressurized fuel is drawn through the fuel passage 74 into an intermediate chamber 75. The intermediate chamber 75 is formed between the pump casing 70 and the motor portion 3.

The fuel drawn into the intermediate chamber 75 passes through the fuel passage 76, which is between the rotor 50 and the stator 10, and the fuel passage 77, which is between the outer wall of the shaft 52 and the stator 10. Fuel drawn into the intermediate chamber 75 partially passes through the fuel passage 78, which is formed between the housing 20 and the stator 10. After passing through the fuel passages 76, 77, 78, the fuel passes through a fuel passage 79 into the outlet passage 42. The fuel passage 79 is formed on the radially outside of the bearing accommodating portion 43 of the cover end 40. The fuel drawn into the outlet passage 42 is discharged through the outlet port 41 to the outside.

Subsequently, a manufacturing method for the fuel pump 1 according to the one embodiment will be described with reference to FIGS. 3 and 4. FIGS. 4A and 4B are schematic views each showing a relation of the housing 20 and the stator 10 in the manufacturing process of the fuel pump 1. In FIG. 4A, the stator 10, which includes the ribs 101, 102, 103, are simplified in consideration of convenience of explanation.

Figure 3:
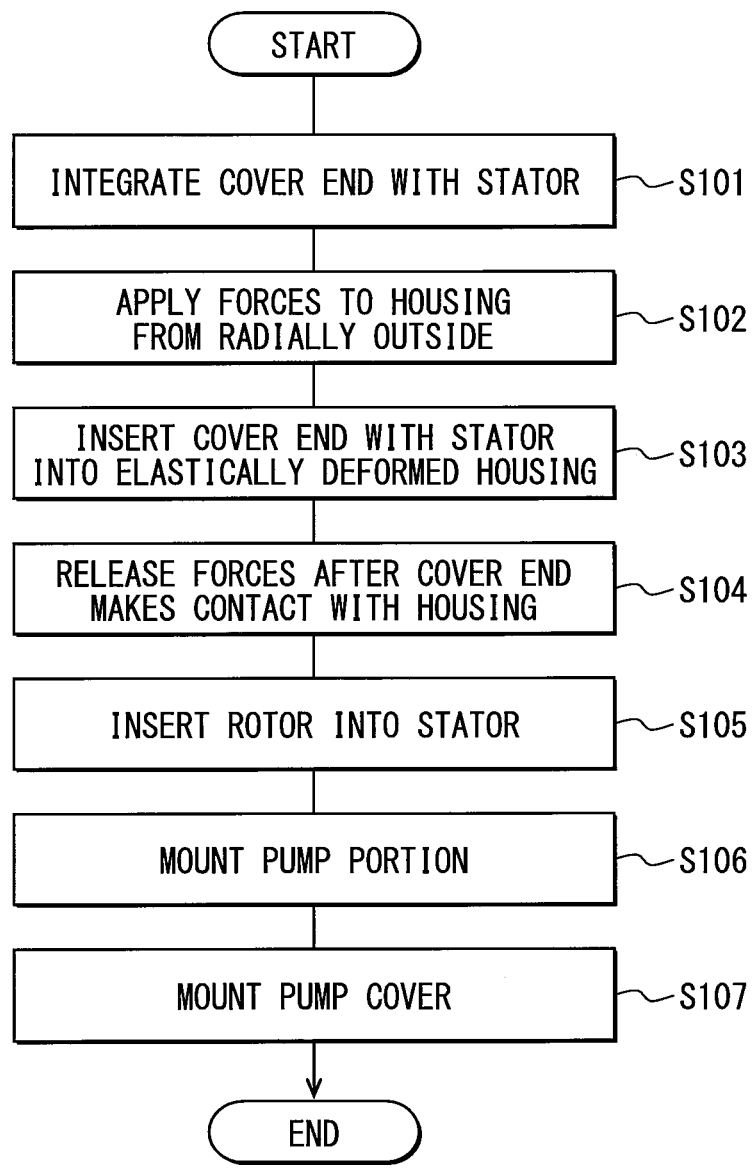
FIG. 3 is a flowchart showing a process of the manufacturing method according to the one embodiment of the present disclosure.
Figure 4A:
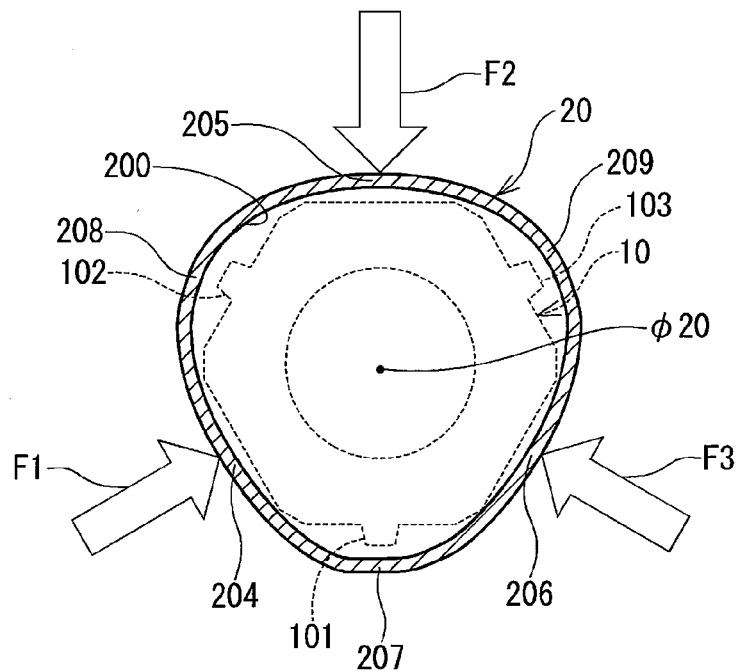
FIG. 4A is a schematic sectional view showing a deformation process.
Figure 4B:
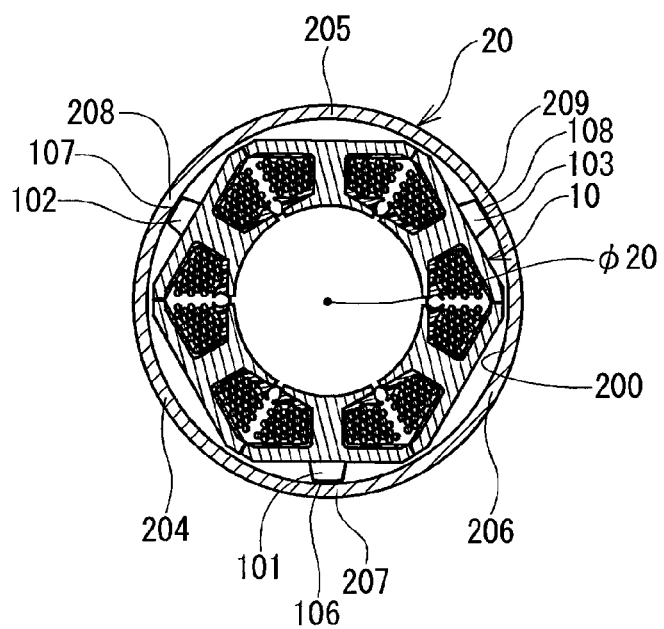
FIG. 4B is a schematic sectional view showing an insertion process, in the manufacturing method according to the one embodiment of the present disclosure.

To begin with, at S101 in FIG. 3, the cover end 40 and the stator 10 are integrally formed. Referring to FIG. 1, in the fuel pump 1 according to one embodiment, the end of the cover end 40 on the side of the stator 10 is connected with the end of the stator 10 on the side of the cover end 40. At S101, the cover end 40 and the stator 10 are connected to each other. Thus, the cover end 40 and the stator 10 are handled as one component subsequent to S101.

Subsequently, at S102, multiple forces are applied from the radially outside onto the housing 20 toward the center axis φ20 of the housing 20. Specifically, as shown in FIG. 4A, forces F1, F2, F3 are applied from the radially outside toward the center axis φ20 of the housing 20. In the manufacturing method of the fuel pump 1 according to the one embodiment, forces are applied in three directions from the radially outside. The forces F1, F2, F3 from the radially outside are generated by causing an acting force generator apparatus (not shown) to generate compressive forces with air pressure. With the present application of the forces, the housing 20, which is originally in an annular shape in cross section, is elastically deformed into a shape in cross section as shown in FIG. 4A. In the present state, portions (first portions) 204, 205, 206 of the housing 20 are applied with the forces F1, F2, F3 from the radially outside. Thus, the portions 204, 205, 206 of the housing 20 are elastically deformed radially inward. The portions 204, 205, 206 of the housing 20 may correspond to a portion (first portion) of a sidewall, which forms a housing. A portion (second portion) 207 of the housing 20 is located between the portion 204 and the portion 206. A portion (second portion) 208 of the housing 20 is located between the portion 204 and the portion 205. A portion (second portion) 209 of the housing 20 is located between the portion 205 and the portion 206. To the contrary, the portions 207, 208, 209 of the housing 20 are elastically deformed radially outward due to the deformation of the portions 204, 205, 206 radially inward. The portions 207, 208, 209 of the housing 20 may correspond to a portion of a sidewall, which forms a housing, elastically deformed radially outward.

Subsequently, at S103, the stator 10, which is formed integrally with the cover end 40, is inserted into the housing 20 elastically deformed. In the present state, as shown in FIG. 4A, the stator 10 is inserted into the housing 20. Specifically, in the present state, the ribs 101, 102, 103 are directed to a center of the portion 207 of the housing 20, a center of the portion 208 of the housing 20, and a center of the portion 209 of the housing 20, respectively. More specifically, the rib 101 is directed to an intermediate portion between the portion 204 and the portion 206. In addition, the rib 102 is directed to an intermediate portion between the portion 204 and the portion 205. In addition, the rib 103 is directed to an intermediate portion between the portion 205 and the portion 206. Thus, the rib 101 is enabled to make contact with the housing 20 at an intermediate position located between the portion 204 and the portion 206. In addition, the rib 102 is enabled to make contact with the housing 20 at an intermediate position located between the portion 204 and the portion 205. In addition, the rib 103 is enabled to make contact with the housing 20 at an intermediate position located between the portion 205 and the portion 206. The stator 10 is integrated with the cover end 40, which is inserted in the housing 20. The step portion 401 of the cover end 40 makes contact with the step 203 of the housing 20. In this way, the position of the stator 10 is regulated relative to the housing 20 in the direction of the center axis φ20.

Subsequently, at S104, application of the forces F1, F2, F3 to the housing 20 from the radially outside is released. When application of the forces F1, F2, F3 radially inward is released, the housing 20 presently elastically deformed recovers into the annular form in cross section, as shown in FIG. 4B. In the present state, the inner wall 200 of the housing 20 makes contact with the wall surfaces 106, 107, 108 of the ribs 101, 102, 103.

Subsequently, at S105, the rotor 50, in which the shaft 52 is equipped, is inserted into the stator 10. Subsequently, at S106, the pump portion 4 is mounted to the housing 20 on the side of the end 201. Finally, at S107, the pump cover 60 is mounted to the end 201 of the housing 20. Further, the end 201 is crimped. Thus, manufacturing of the fuel pump 1 is completed.

Conventionally, in manufacturing of a fuel pump, a stator is press-fitted into a housing. In this way, the stator is fixed to the housing. Originally, ribs are formed on the radially outside of the stator to align the center axis of housing relative to the center axis of the stator with sufficient accuracy. In the conventional press-fitting, the ribs may slide on the inner wall of the housing. Consequently, the ribs may deform due to burr and/or plucking. As a result, accuracy of alignment between the center-axis of the housing and the center-axis of the stator may decrease.

In the manufacturing method of the fuel pump 1 according to the one embodiment, the housing 20 is first elastically deformed. Subsequently, the stator 10 is inserted into the housing 20. In the present state, the stator 10 is inserted such that the ribs 101, 102, 103 of the stator 10 are enabled to make contact with the portions 207, 208, 209, which are expanded radially outward. The portions 207, 208, 209 are parts of the sidewall, which forms the housing 20 being elastically deformed. After insertion of the stator 10, application of the forces F1, F2, F3 from the radially outside to the housing 20 is released. Thus, the ribs 101, 102, 103 make contact to the inner wall 200 of the housing 20. In this way, the ribs 101, 102, 103 can be protected from deformation caused by burr and/or plucking when being slid on the inner wall 200 of the housing 20. Therefore, the center axis of the stator 10 can be aligned relative to the center axis φ20 of the housing 20 with high accuracy. In addition, the center axis of the stator 10 can be aligned with the center axis φ20 of the housing 20 with high accuracy, thereby to enable to reduce noise caused by oscillation.

In addition, the manufacturing method of the fuel pump 1 according to the one embodiment enables to reduce deformation of the ribs caused by burr and/or plucking, thereby to reduce occurrence of foreign matter in its manufacturing process.

It is noted that, in order to manufacture a fuel pump with low noise and low oscillation, it may be desirable to set a press-fitting length of the stator to the housing at a large value, thereby to align the center axis of the housing relative to the center axis of the stator with high accuracy. It is further noted that, in a case where the press-fitting length is set at a large value, a large load is needed to press-insert the stator into the housing. In addition, a manufacturing time for the press-fitting also becomes long. To the contrary, the manufacturing method of the fuel pump 1 according to the one embodiment causes elastic deformation in the housing 20 before insertion of the stator 10. Therefore, the manufacturing method enables to align the center axis of the stator 10 relative to the center axis φ20 of the housing 20 with high accuracy. Therefore, the manufacturing method enables to reduce requirement to set the press-fitting length at a large value. Thus, the manufacturing method does not require a large load for the press-fitting. In addition, the manufacturing method enables to reduce a manufacturing time for the press-fitting.

In addition, the manufacturing method enables to align the center axis of the stator 10 relative to the center axis φ20 of the housing 20 with high accuracy, without setting the press-fitting length at a large value. Therefore, enlargement of the fuel pump can be avoided.

In addition, in the manufacturing method of the fuel pump 1 according to one embodiment, the forces F1, F2, F3 from the radially outside are caused by air pressure and applied onto the housing 20 to deform the housing 20 elastically. The manufacturing method may avoid excessive deformation of the housing 20.

Other Embodiment (a) In the above embodiment, the three ribs are formed at the radially outside of the stator. In addition, the three ribs are located at the regular intervals on the concentric circle, which is centered on the point on the center axis of the stator. It is noted that, the number of the ribs and the positions of the ribs are not limited to the above-described example.

(b) In the above embodiment, three forces are applied from the radially outside onto the housing in the manufacturing process of the fuel pump. It is noted that, the number of the forces applied from the radially outside is not limited to that of the above-described example. The number of the forces from the radially outside may be arbitrarily determined to cause elastic deformation in the housing sufficiently.

(c) In the above embodiment, the housing and the stator are in tubular forms. It is noted that, the shapes of the housing and the stator are not limited to those in the above-described example. The housing may be formed in a pipe shape.

(d) In the above embodiment, the ribs are formed to make contact at the intermediate positions, each located between the portions on which the forces are applied from the radially outside. It is noted that, the portions, which the ribs make contact with, are not limited to those in the above-described example. The ribs may be configured to make contact with portions, which are deformed radially outward when the housing is elastically deformed.

(e) In the above embodiment, air pressure causes the force from the radially outside onto the housing when the housing is elastically deformed. It is noted that, the method to cause the forces radially outside is not limited to that in the above-described example.

(f) In the above embodiment, the cover end and the stator are formed to be integrated. It is noted that, the cover end and the stator may be manufactured as separate components of the fuel pump.

The fuel pump according to the present disclosure includes the housing, the stator, the rotor, the shaft, and the impeller. The housing is in a tubular shape. The stator is in a tubular shape. The stator has multiple ribs, which are configured to make contact with the inner wall of the housing when accommodated in the housing. The rotor is rotatably equipped on the radially inside of the stator. The shaft is coaxial with the rotor and integrally rotatable with the rotor. The impeller is equipped to the end of the shaft and rotatable with the shaft to pressurize fuel and to discharge the fuel.

The manufacturing process for the fuel pump includes a deformation process, an insertion process subsequent to the deformation process, and an affixation process subsequent to the insertion process. In the deformation process, forces are applied from the radially outside onto multiple portions of the sidewall, which forms the housing, thereby to cause elastic deformation in the housing. In the insertion process, the stator is inserted, such that the multiple ribs are enabled to make contact with the multiple portions of the sidewall, which forms the housing being elastically deformed, the multiple portions being deformed radially outward. In the affixation process, application of the forces from the radially outside onto the housing is released to cause the inner wall of the housing to make contact with the multiple ribs.

In the manufacturing method of the fuel pump according to the present disclosure, before insertion of the stator into the housing, the forces are applied from the radially outside onto the multiple portions of the sidewall, which forms the housing, to cause elastic deformation in the housing. In the present state, the multiple portions of the sidewall, onto which the forces are applied from the radially outside, are elastically deformed radially inward. To the contrary, the portions of the sidewall, onto which forces are not applied from the radially outside, are elastically deformed radially outward. In the insertion process, the stator is inserted into the housing. In the insertion process, the stator is inserted, such that the multiple ribs are enabled to make contact with the multiple portions of the sidewall, which forms the housing being elastically deformed radially outward. In this way, the stator is inserted into the housing, without causing ablation between the multiple ribs and the inner wall of the housing. Subsequent to the insertion process, application of the forces from the radially outside onto the housing is released. Thus, the housing returns in form into the original shape, thereby to cause the inner wall of the sidewall to make contact with the ribs of the stator. In this way, the stator can be press-fitted inside the housing, without causing burr and/or plucking in the ribs. Therefore, the method enables to align the center axis of the housing relative to the center axis of the stator with high accuracy.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A manufacturing method for a fuel pump, the fuel pump comprising:
    a housing in a tubular shape;
    a pump cover equipped to one end of the housing, the pump cover having an inlet port for drawing fuel;
    a cover end equipped to an other end of the housing, the cover end having an outlet port for discharging fuel;
    a stator in a tubular shape, the stator equipped with a plurality of windings, the stator having a plurality of ribs, which are configured to make contact with an inner wall of the housing when accommodated in the housing;
    a rotor rotatable on a radially inside of the stator;
    a shaft coaxial with the rotor and rotatable integrally with the rotor; and
    an impeller equipped to an end of the shaft on a side of the pump cover, the impeller rotatable with the shaft to pressurize fuel flowing from the inlet port and to discharge fuel through the outlet port,
    the manufacturing method comprising:
    applying force from a radially outside to a plurality of first portions of a sidewall of the housing on a radially outside to elastically deform the housing in a deformation process, the housing being formed of a metallic material in an annular form in cross section perpendicular to a center axis;
    inserting the stator into the housing, such that the ribs, which are formed of resin, are enabled to make contact with second portions of the sidewall of the housing, the second portions being elastically deformed radially outward, in an insertion process subsequent to the deformation process; and
    releasing application of the force to cause the ribs to make contact with the inner wall of the housing, in an affixation process subsequent to the insertion process, wherein the sidewall of the housing, with which the ribs make contact, is in the annular form in cross section perpendicular to the center axis, wherein
    in the affixation process, each of the ribs makes contact with the inner wall to form a cover-end-side gap and a pump-cover-side gap with the inner wall at portions, which are adjacent to the rib in a direction of the center axis,
    the cover-end-side gap is located on a side of the cover end,
    the pump-cover-side gap is located on a side of the pump cover,
    in the affixation process, the stator makes contact with the inner wall at a contact portion, and
    the contact portion is located on an opposite side of the cover-end-side gap from the rib in the direction of the center axis.

2. The manufacturing method according to claim 1, wherein the ribs are equipped to a radially outside of the stator and located at a regular interval.

3. The manufacturing method according to claim 1, wherein in the affixation process, the ribs make contact with the inner wall at intermediate positions each being located between the first portions on which the force are applied from the radially outside.

4. The manufacturing method according to claim 1, wherein the force from the radially outside is caused with compressed air.

5. The manufacturing method according to claim 1, wherein in the affixation process, application of the force is released
    to recover the inner wall radially inward into the annular form to cause the inner wall to make contact with the ribs
    to regulate a position of the stator relative to the housing in a direction of the center axis of the housing and
    to align a center axis of the stator relative to the center axis of the housing.

6. The manufacturing method according to claim 1, wherein each of the ribs is formed in a part of the stator in a direction of the center axis.

7. The manufacturing method according to claim 1, wherein in the affixation process, application of the force is released to recover the sidewall of the housing into the original annular form in cross section.

8. The manufacturing method according to claim 1, wherein in the affixation process, the stator makes contact with the inner wall via the end cover at the contact portion.

9. The manufacturing method according to claim 1, wherein
    the stator has a cross section perpendicular to the center axis,
    the cross section is in a regular polygonal shape,
    the stator has a plurality of flat surfaces on a radially outside,
    the ribs protrude radially outward from at least two of the flat surfaces, respectively, and
    the ribs are arranged alternately at a regular interval in a circumferential direction about the center axis.

10. The manufacturing method according to claim 1, wherein
    the stator has a cross section perpendicular to the center axis,
    the cross section is in a hexagonal shape having six flat surfaces,
    the ribs protrude radially outward from three of the six flat surfaces, respectively, and
    the ribs are arranged alternately at a regular interval in a circumferential direction about the center axis.

* * * * *